United States Patent [19]

Staskal et al.

[11] 4,335,855
[45] Jun. 22, 1982

[54] DRY PARTICLE DISTRIBUTOR FOR THE TREATMENT OF FORAGE

[76] Inventors: Maynard L. Staskal, Rte. 4, Box 40, Boscobel, Wis. 53805; Alvin J. Eissens, 539 S. Madison, Lancaster, Wis. 53813

[21] Appl. No.: 163,720

[22] Filed: Jun. 27, 1980

[51] Int. Cl.³ .............................................. A01C 15/04
[52] U.S. Cl. ..................................... 239/654; 100/74
[58] Field of Search .................. 239/654, 222.11, 518, 239/523; 100/73, 74; 56/341, 345; 296/6, 11

[56] References Cited

U.S. PATENT DOCUMENTS

| | | | |
|---|---|---|---|
| 2,852,166 | 9/1958 | Gandrud | 222/311 |
| 2,990,186 | 6/1961 | Gandrud | 275/14 |
| 3,096,004 | 7/1963 | Gandrud | 222/410 |
| 3,369,760 | 2/1968 | Schaible | 239/523 |
| 4,089,441 | 5/1978 | Cole et al. | 239/654 |
| 4,186,885 | 2/1980 | Christian | 239/654 |
| 4,228,638 | 10/1980 | Rabe et al. | 100/74 |

Primary Examiner—James B. Marbert
Attorney, Agent, or Firm—Isaksen, Lathrop, Esch, Hart & Clark

[57] ABSTRACT

A distributor (10) of dry, particulate material released in metered amounts by a hopper (22), for the treatment of forage in a mechanical baler (12). A manifold (30) has an air inlet (34) and at least one air outlet (32). An air blower (38) is adapted to discharge into the air inlet (34) at a selected flow rate. A bender (40) has an air tube (48) communicating with the air outlet (32) and a particulate material discharge tube (50) adapted to receive particulate material from the hopper (22). The particulate material discharge tube (50) discharges within the air tube (48), suspending the particulate material in the air. A distributor nozzle (52) communicates with the blender (40) and has a focusing vent (54) and an impact plate (56) facing the focusing vent (54) to receive and deflect particulate material exhausted therethrough.

7

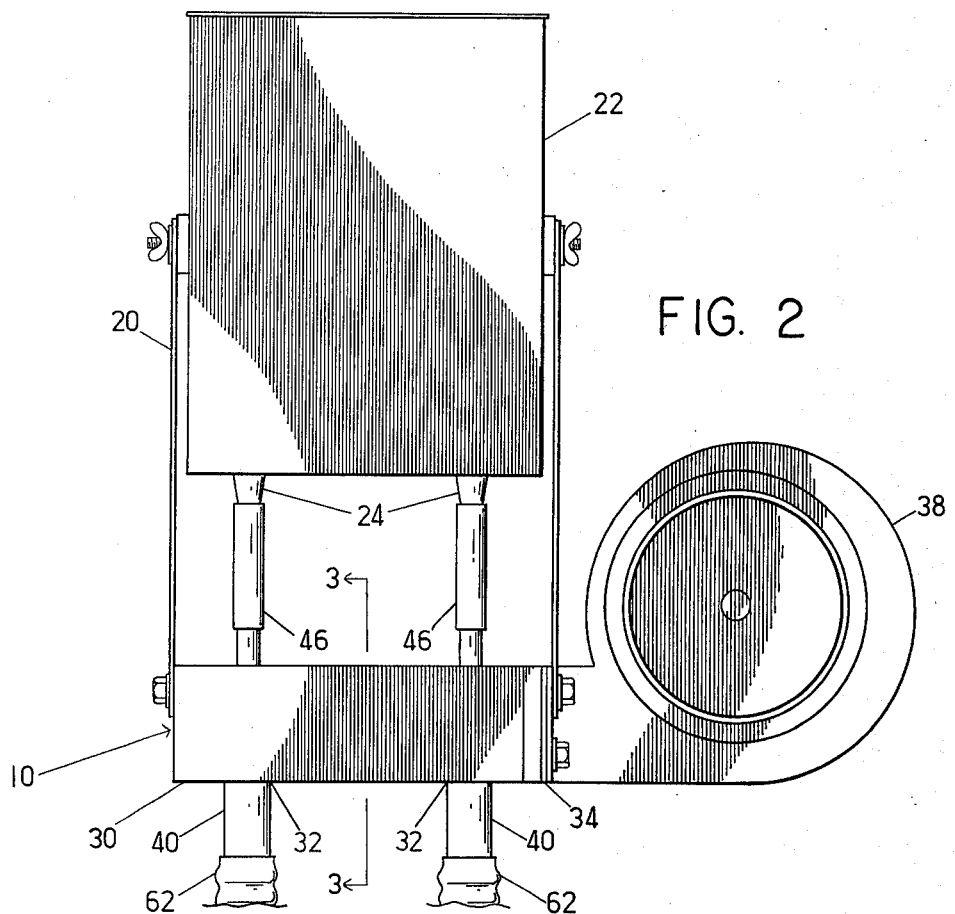
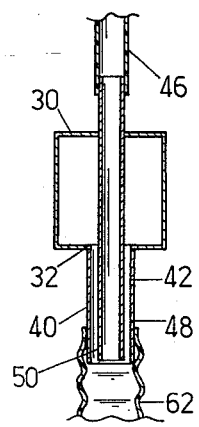
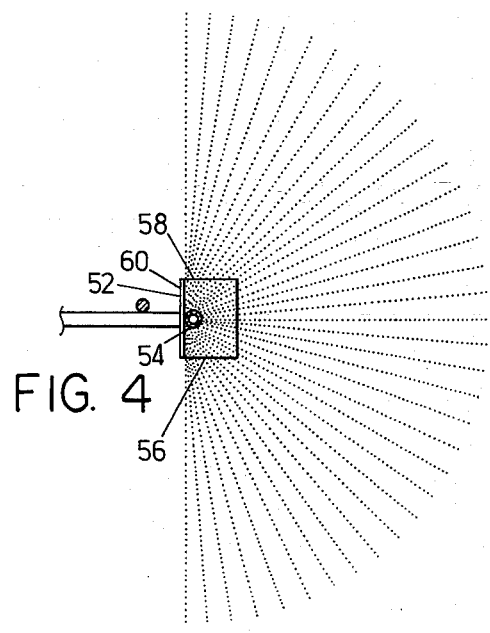

DRY PARTICLE DISTRIBUTOR FOR THE TREATMENT OF FORAGE

TECHNICAL FIELD

The present invention relates to dry particle distributors in general and, in particular, to a particle distributor for the treatment of forage with a dry, particulate material while the forage is being baled in a mechanical baler.

BACKGROUND OF PRIOR ART

The prior art is generally cognizant of the treatment of forage with dry particulate materials while the forage is being formed into bales in a mechanical baler. The treatment material is generally a preservative or fungicide.

Conventionally, a mechanical hopper is located high on the baler in some convenient place. Hoses or a chute extend from the hopper to a position just above that occupied by the forage immediately before it is compressed into bales. The hopper is equipped with a metering device allowing the operator to regulate the flow of dry, particulate material. The material released by the hopper is drawn through the hoses or chute by gravity and scatters over the forage.

Because of the dependence of conventional distributing devices upon the force of gravity to draw the particulate treatment material from the hopper to the forage, the hoses or chutes of such distributors must be steeply inclined or vertical to avoid clogging. Similarly, sharp twists or turns in the hoses or chutes make the distributor vulnerable to clogging. Furthermore, conventional distributors are limited in the area over which they can distribute treatment material. The flow from a hose or chute scatters only to a limited extent, falling straight down after leaving the hose. Consequently, multiple hoses or chutes must be employed when the baler is designed to take up a broad width of forage, as is the case in large rotary balers.

BRIEF SUMMARY OF THE INVENTION

The present invention is summarized in that a distributor of dry, particulate material released in metered amounts by a hopper for the treatment of forage in a mechanical baler includes a manifold having an air inlet and at least one air outlet. An air blower is adapted to discharge into the air inlet of the manifold. A blender has an air tube communicating with the air outlet and adapted to receive air therefrom. The blender also has a particulate material discharge tube adapted to receive particulate material from the hopper, the particulate material discharge tube discharging within the air tube. A distributor nozzle communicates with the blender and is adapted to receive air and suspended particulate material therefrom. The distributor nozzle includes a focusing vent and an impact plate facing the focusing vent to receive and deflect particulate material exhausted therethrough.

A primary object of the invention is to provide a distributor of dry, particulate material adapted to eject the material from a distributor nozzle in such a way as to disperse it across an area of selected width.

A second object of the invention is to provide for the forceful transporting of the dry, particulate material used to treat forage in a mechanical baler from the hopper in which it is stored to the point of distribution onto the forage so as to decrease the need for the vertical disposition of supply hoses and chutes otherwise dependent upon gravity for their operation.

Another object of the invention is to reduce the incidence of clogging of particulate material in the hoses and supply chutes of a distributor thereof by providing for the forceful movement of the material through the hoses and chutes.

Other objects, features, and advantages of the invention will be apparent from the following detailed description taken in conjunction with the accompanying drawings showing a preferred embodiment of a distributor of dry, particulate material for the treatment of forage in a mechanical baler, exemplifying the principles of the invention.

BRIEF DESCRIPTION OF THE DRAWINGS

FIG. 2 is a front elevation view of the hopper and blender of the dry particle distributor of FIG. 1.

FIG. 3 is a cross section of a broken away part of the dry particle distributor of FIG. 1, taken along section lines 3—3 of FIG. 2.

FIG. 4 is a cross-section view of the distributor nozzle of the dry particle distributor of FIG. 1, taken along section lines 4—4 of FIG. 1.

DETAILED DESCRIPTION OF THE PREFERRED EMBODIMENT

Figure 1:
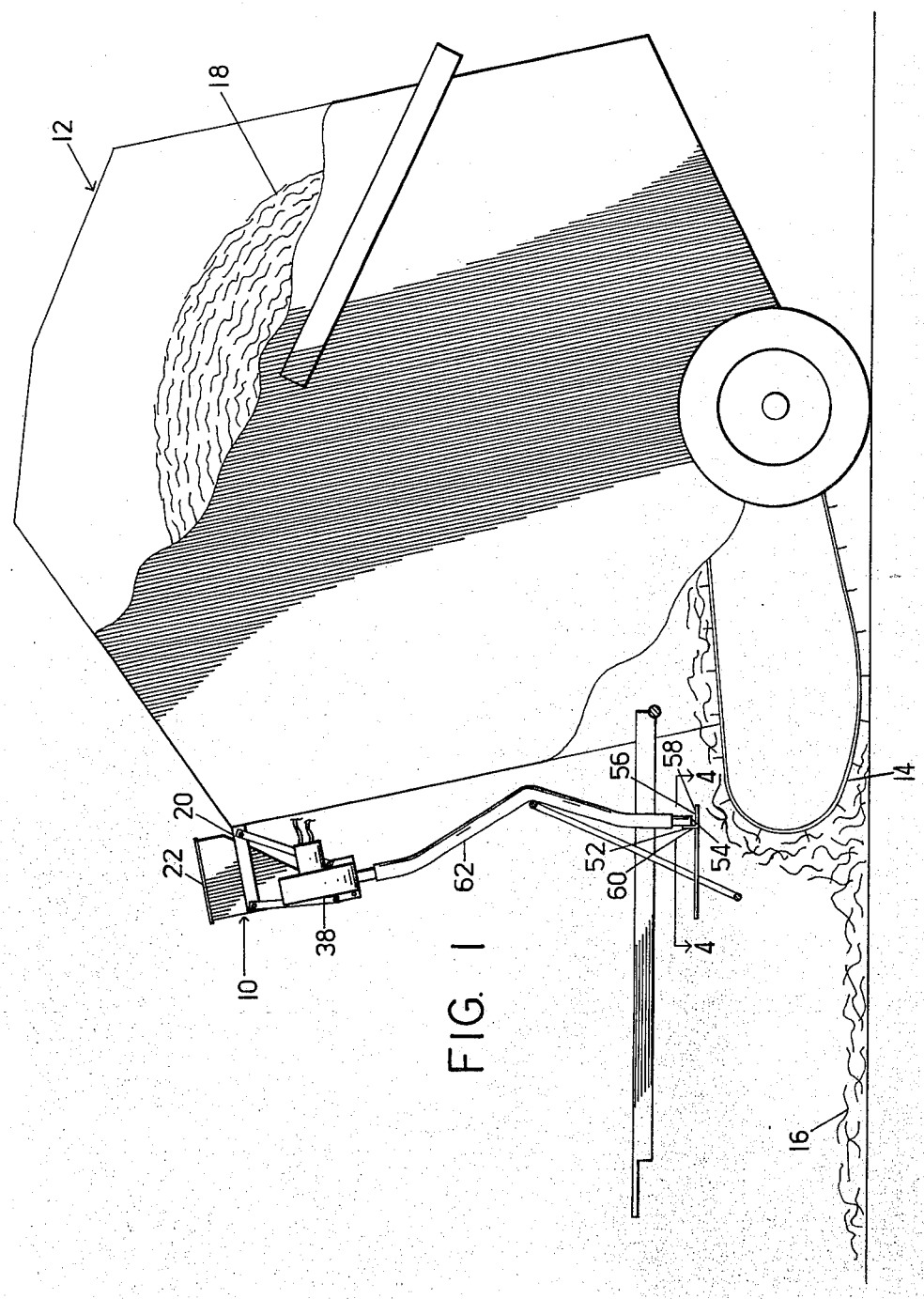
FIG. 1 is a side elevation view of the dry particle distributor of the invention installed on a rotary baler (shown schematically).

Referring more particularly to the drawings, wherein like numbers refer to like parts, FIG. 1 shows a dry particle distributor for the treatment of forage in a mechanical baler with a selected dry, particulate material, generally indicated at 10, constructed in accord with the present invention. The distributor 10 is adapted to be installed on any conventional baler for forage. By way of example, the embodiment indicated at 10 is installed on a conventional rotary hay baler shown generally at 12. The hay baler 12 has a hay pickup 14 adapted to pick up a windrow of hay 16 as the baler is moved across the field and transport it into the baler where it is compressed to form a bale 18.

The distributor has a frame 20 rigidly attached to the hay baler 12 at a convenient location preferably substantially above the point at which it is desired to distribute the dry, particulate material used to treat the hay. A conventional hopper 22 is rigidly attached to the frame 20 and is adapted to contain a selected quantity of the dry, particulate material to be distributed. Such hoppers conventionally include a metering device for releasing the particulate material contained in the hopper 22 at a selected rate. In the preferred embodiment, the hopper 22 has at least one exit tube 24 through which the hopper is adapted to release a metered flow of particulate material.

The distributor 10 has a manifold 30 having an air inlet 34 and at least one air outlet 32. An air blower such as the conventioanl fan shown at 38 is adapted to discharge into the air inlet 34 of the manifold 30.

A blender 40 is adapted to suspend the particulate material released by the hopper 22 in the air being discharged by the air blower 38. The blender 40 has an air tube 48 communicating with the air outlet 32 and adapted to receive air therefrom. In the preferred embodiment, the manifold 30 has two air outlets 32. A blender 40 with its air tube 48 is associated with each of the air outlets 32. The number of air outlets 32 and associated blenders 40 and related parts to be described below is determined by the size of the area over which the particulate material is to be distributed.

The blender 40 has a particulate material discharge tube 50 adapted to receive particulate material from the hopper 22. In the preferred embodiment, a connecting tube 46 communicates between the particulate material discharge tube 50 and an exit tube 24 of the hopper 22. The particulate material discharge tube 50 discharges within the air tube 48 to suspend the particulate material discharged in the air passing through the air tube 48. Preferably, the air tube 48 has inner surfaces defining a constricted area 42 therein, with the particulate material discharge tube 50 discharging within the air tube 48 substantially at the constricted area 42. In the preferred embodiment, the air tube 48 has a selected inside diameter, and the particulate material discharge tube 50 has a selected outside diameter less than the inside diameter of the air tube. The particulate material discharge tube 50 extends within the air tube 48 for a selected distance, co-axial therewith, thus creating the constricted area 42. The particulate material discharge tube 50 discharges at the point at which it ends, being the same point at which the constriction of the air tube 48 is terminated. Consequently, the particulate material is discharged into an area of turbulent air flow and reduced lateral air pressure, increasing the effectiveness of the mixing of the air and the particulate material and decreasing any tendency for air in the air tube 48 to be exhausted through the particulate material discharge tube 50.

A distributor nozzle 52 communicates with the blender 40 for discharging the air and suspended particulate material passing out of the blender. Preferably, internal surfaces of the nozzle 52 define a focusing vent 54 having substantially parallel and unobstructed internal walls adapted to discharge the stream of air and suspended particulate material uni-directionally. An impact plate 56 is adapted to receive and deflect the particulate material being exhausted through the focusing vent 54. Preferably, the impact plate 56 has a splash surface 58 facing the focusing vent 54, against which the exhausted particles from the focusing vent strike. Preferably, the splash surface 48 is flat and is rectangular in shape, having long and short sides. The ratio between the lenghts of the long and short sides is preferably substantially 4 to 3. In the preferred embodiment, the splash surface 58 is oriented at 90 degrees to the axis of the focusing vent 54 and is so oriented that the focusing vent is displaced toward the center of one of the long sides of the splash surface. A back plate 60 is located at the long side of the splash surface 58 nearest to the focusing vent 54 and extends upwardly from the splash surface and parallel to the axis of the focusing vent for selected distance.

When the dry particle distributor 10 is in operation, air is blown into the manifold 30 by the air blower 38. Dry, particulate material to be distributed is released in metered amounts from the hopper 22 and is suspended by the blender 40 in the air received by the air tube 48 from the air outlet 32 of the manifold 30. The air and suspended particles are exhausted through the focusing vent 54 of the distributor nozzles 52 and are directed at the splash surface 58 of the impact plate 56. The particles rebound from the splash surface 58. The back plate 60 prevents the particles from rebounding toward the side on which the back plate is located. Consequently, the particles are distributed by the distributor nozzle 52 over an angle of approximately 180 degrees and in a direction away from back plate 60, as is shown by the dotted lines of FIG. 4, indicating the resulting dispersion pattern. The distance that the particles will travel from distributor nozzle 52, and consequently the width of the band of hay passing through the hay baler 12 that may be treated by a single nozzle 52, may be controlled by adjusting the air flow rate. In the event that a very broad width of forage is to be treated, as is commonly the case in large rotary hay balers, more than one distributor nozzle 52 and associated blender 40 may be used as is indicated in FIG. 2. If it is desirable that the distributor nozzle 52 be in a location remote from that of the blender 40, a hose 62 may be conveniently used to communicate between them. By this means, the hopper 22 and blender 40 may be in a location convenient for servicing, with the distributor nozzle 52 located and oriented so as to direct the particulate material being exhausted therethrough into the forage immediately before it is compressed to make a bale.

The hopper 22 and the air blower 38 may be of conventional design, suitable examples of which are standard articles of trade. The blender 40 and the distributor nozzle 52 may be made from sheet metal and tubing using conventional metal working techniques. Alternatively, these parts may be molded from any suitably strong material, such as metal or appropriate plastics.

It is understood that the present invention is not limited to the particular construction and arrangement of parts illustrated and disclosed. Instead, it embraces all such modified forms thereof as come within the scope of the following claims.

What is claimed is:

1. A distributor (10) of dry, particulate material released in metered amounts by a hopper (22) for the treatment of forage in a mechanical baler (12), comprising
    (a) a manifold (30) having an air inlet (34) and at least one air outlet (32),
    (b) an air blower (38) adapted to discharge into the air inlet (34) of the manifold (30),
    (c) a blender (40) having an air tube (48) with a selected inside diameter with inner surfaces defining a constricted area (42) therein communicating with the air outlet (32) and adapted to receive air therefrom and a particulate material discharge tube (50) adapted to receive particulate material from the hopper (22), the particulate material discharge tube (50) having a selected outside diameter less than the inside diameter of the air tube (48) and extending within the air tube (48) for a selected distance to discharge substantially at the constricted area (42), and
    (d) a distributor nozzle (52) communicating with the blender (40) and adapted to receive air and suspended particulate material therefrom and disperse the suspended particulate material over the forage.

2. A distributor (10) of dry, particulate material released in metered amounts by a hopper (22) for the treatment of forage in a mechanical baler (12), comprising
    (a) a manifold (30) having an air inlet (34) and at least one air outlet (32),
    (b) an air blower (38) adapted to discharge into the air inlet (34) of the manifold (30),
    (c) a blender (40) having an air tube (48) with a selected inside diameter with inner surfaces defining a constricted area (42) therein communicating with the air outlet (32) and adapted to receive air therefrom and a particulate material discharge tube (50) adapted to receive particulate material from the hopper (22), the particulate material discharge tube (50) having a selected outside diameter less than the inside diameter of the air tube (48) and extending within the air tube (48) for a selected distance to discharge substantially at the constricted area (42), and (d) a distributor nozzle (52) communicating with the blender (40) and adapted to receive air and suspended particulate material therefrom, the distributor nozzle (52) including a focusing vent (54) and an impact plate (56) and facing the focusing vent (54) to receive and deflect particulate material exhausted therethrough.

3. A distributor (10) of dry, particulate material for the treatment of forage in a mechanical baler (12), comprising (a) a hopper (22) for releasing the particulate material at a selected rate, (b) a manifold (30) having an air inlet (34) and at least one air outlet (32), (c) an air blower (38) adapted to discharge into the air inlet (34) of the manifold (30), (d) a blender (40) having an air tube (48) with a selected inside diameter with inner surfaces defining a constricted area (42) therein communicating with the air outlet (32) and adapted to receive air therefrom and a particulate material discharge tube (50) adapted to receive particulate material from the hopper (22), the particulate material discharge tube (50) having a selected outside diameter less than the inside diameter of the air tube (48) and extending within the air tube (48) for a selected distance to discharge substantially at the constricted area (42), and (e) a distributor nozzle (52) communicating with the blender (40) and adapted to receive air and suspended particulate material therefrom, the distributor nozzle (52) including a focusing vent (54) and an impact plate (56) facing the focusing vent (54) to receive and deflect particulate material exhausted therethrough.

4. The distributor (10) of claim 2 or claim 3 wherein the particulate material discharge tube (50) is positioned co-axially within the air tube (48).

5. The distributor (10) of claim 2 or claim 3 wherein the impact plate (56) has (a) a splash surface (58) substantially rectangular in shape and having long and short sides, the splash surface (58) substantially facing the focusing vent (54) and so oriented that the focusing vent (54) is displaced toward the center of one of the long sides of the splash surface (58), and (b) a back plate (60) extending from the long side of the splash surface (58) nearest to the focusing vent (54) upwardly for a selected distance to direct particles rebounding from the splash surface (58) in a direction away from the back plate (60).

6. The distributor (10) of claim 2 or claim 3 wherein the impact plate (56) has a splash surface (58) substantially rectangular in shape and having long and short sides, the ratio between the lengths of the long and short sides being approximately 4 to 3, the splash surface (58) substantially facing the focusing vent (54) and so oriented that the focusing vent (54) is displaced toward the center of one of the long sides of the splash surface (58), and a back plate (60) extending from the long side of the splash surface (58) nearest to the focusing vent (54) upwardly for a selected distance to direct particles rebounding from the splash surface (58) in a direction away from the back plate (60).

7. A distributor (10) of dry, particulate material for the treatment of forage in a mechanical baler (12), comprising (a) a hopper (22) for releasing the particulate material at a selected rate, (b) a manifold (30), having an air inlet (34) and at least one air outlet (32), (c) an air blower (38) adapted to discharge into the air inlet (34) of the manifold (30), (d) a blender (40) having an air tube 48 communicating with the air outlet (32) and adapted to receive air therefrom, the air tube (48) having a selected inside diameter with inner surfaces defining a constricted area (42) therein, and a particulate material discharge tube (50) adapted to receive particulate material from the hopper (22), the particulate material discharge tube (50) having a selected outside diameter less than the inside diameter of the air tube (48), the particulate material discharge tube (50) extending within the air tube (48) for a selected distance, co-axial therewith, the particulate material discharge tube (50) discharging within the air tube (48) substantially at the constricted area (42), and (e) a distributor nozzle (52) communicating with the blender (40) and adapted to receive air and suspended particulate material therefrom, the distributor nozzle (52), including a focusing vent (54) and an impact plate (56) facing the focusing vent (54) to receive and deflect particulate material exhausted therethrough.

* * * * *